(12) United States Patent
Iacuzio

(10) Patent No.: US 10,271,688 B2
(45) Date of Patent: *Apr. 30, 2019

(54) CULINARY DISPENSING UTENSIL

(71) Applicant: Maddy E. Iacuzio, Fords, NJ (US)

(72) Inventor: Maddy E. Iacuzio, Fords, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/629,496

(22) Filed: Jun. 21, 2017

(65) Prior Publication Data

US 2017/0280935 A1   Oct. 5, 2017

Related U.S. Application Data

(63) Continuation of application No. 14/872,796, filed on Oct. 1, 2015, now Pat. No. 9,743,806.

(51) Int. Cl.
| | |
|---|---|
| *A47J 37/10* | (2006.01) |
| *A46B 7/04* | (2006.01) |
| *A46B 11/00* | (2006.01) |
| *A46B 5/00* | (2006.01) |
| *A47J 43/28* | (2006.01) |
| *A47J 47/01* | (2006.01) |

(52) U.S. Cl.
CPC .......... *A47J 37/106* (2013.01); *A46B 5/0095* (2013.01); *A46B 7/04* (2013.01); *A46B 11/001* (2013.01); *A46B 11/002* (2013.01); *A47J 43/28* (2013.01); *A47J 47/01* (2013.01)

(58) Field of Classification Search
CPC ........ A47J 31/106; A47J 37/10; A47J 37/108; A46B 7/04; A46B 11/00; A46B 11/001; A46B 11/0024; A46B 11/0055; A46B 11/0065

See application file for complete search history.

(56) References Cited

U.S. PATENT DOCUMENTS

| | | | | |
|---|---|---|---|---|
| 5,984,555 | A * | 11/1999 | Samad ...................... | A46B 9/02 15/164 |
| 7,806,612 | B1* | 10/2010 | Wangler ................. | A46B 9/005 15/230.11 |
| 9,238,246 | B2* | 1/2016 | Surratt ................ | B05C 17/0245 |

* cited by examiner

*Primary Examiner* — David J Walczak

(57) ABSTRACT

An improved culinary device featuring a handle, a chamber that can receive fluid such as a sauce, a component for dispensing the fluid, and a component for measuring the fluid. The device features a head, which is meant to contact a portion of food.

9 Claims, 3 Drawing Sheets

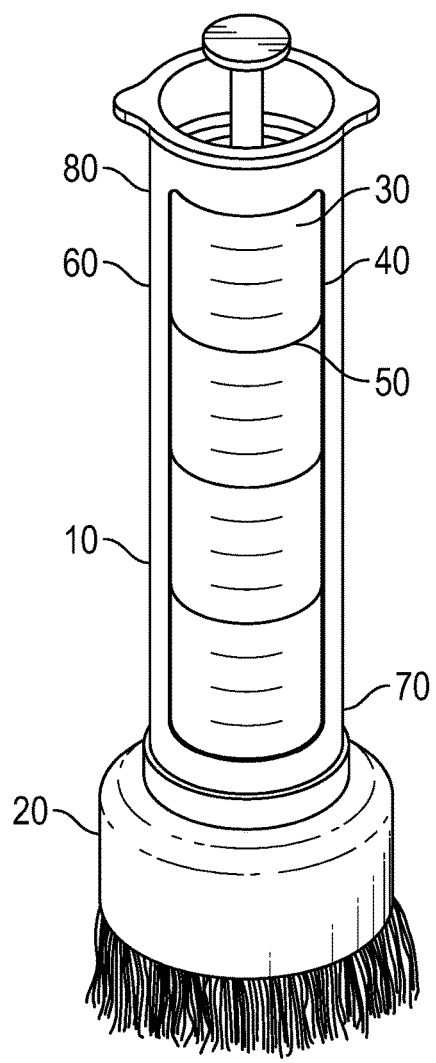
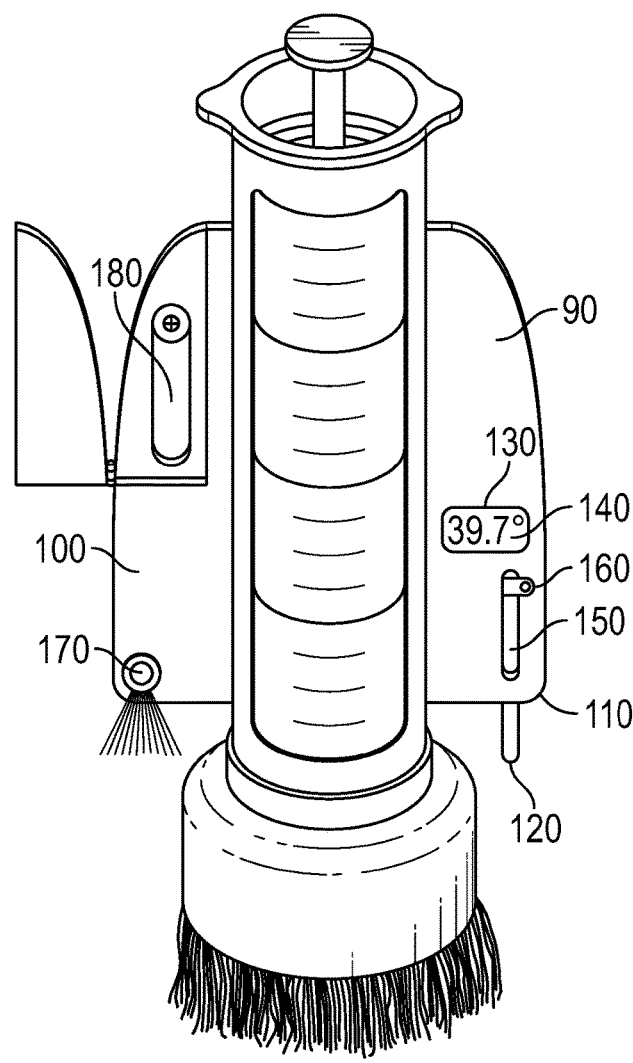
FIG. 1
FIG. 2

CULINARY DISPENSING UTENSIL

PRIORITY

This continuation application claims priority to U.S. application Ser. No. 14/872,796, filed Oct. 1, 2015. The above references application is incorporated herein by reference as if restated in full.

BACKGROUND

Food preparation may involve many kinds of applications of tools and ingredients. There are currently tools on the market that can handle food so as to move it from one dish to another dish, or a pan to a pot, or a pan to a dish. There are currently tools that facilitate the application of one set of ingredients to another set of ingredients, including tools that bask, and tools that transport sauces. There are also tools that take measurements of food parameters, such as temperature and volume. However, there is generally a lack of tools that combine these applications into a single usable device.

SUMMARY

It is an object of this invention to provide an improved culinary device.

In one aspect, the device comprises a handle. The handle is designed to be held by a human hand, and may comprise any shape or size fit for that purpose. It may be at least partly made of any suitable rigid material, such as wood or plastic. The handle may have a front portion, a back portion, a top portion, and a bottom portion. It may also have one or more side portions, which connect the top and bottom portions. The top, bottom, and/or side portions may be round, flat, angular, or any combination thereof.

The handle may have an elongated shape to conform to the substantially closed palm of a hand. The primary axis of this elongated shape may be substantially straight, or it may curve, preferably near the front portion, so that the user of the device may operate it upon a target (such as a piece of meat) at a slight angle, thereby obviating the need to bend the wrist. This curve may be anywhere between zero and one hundred and eighty degrees from the primary axis.

The handle may feature one or more ridges or grooves to match the thumb and fingers of a normal-sized hand. In one version, the thumb ridge is disposed on the top portion closer to the front portion, and the finger ridges are disposed on the bottom portion. In another version, the finger ridges are disposed on one side portion and the thumb ridge is disposed on the opposite side portion.

In one embodiment, the handle comprises an inner surface and an outer surface, with the inner surface comprising a cavity. The handle may comprise a first opening at the front portion and a second opening at the back portion. The opening may be closable by a top of a suitable type.

In another embodiment, the handle comprises a window on the top portion. The window may comprise an opening or a transparent pane permitting, respectively, access or a view into the cavity.

In one aspect, the device may comprise a chamber which may be filled with a fluid material, such as a sauce. The chamber may be of any size or shape, but preferably cylindrical. It may be made of any suitable materials, such as plastic or silicon. The chamber may be elastic, rigid, or partly elastic and partly rigid. It may be opaque or transparent, or feature opaque and transparent portions.

In one aspect, the device comprises a volumetric measuring means to detect the amount of fluid material stored in the device, and consequently, to determine how much is being used or applied to the target. The volumetric measuring means may comprise an at least partly transparent section featuring graduate and subgraduate lines. The lines may be arranged on the chamber to correspond to measurements in fluid ounces or milliliters. The lines may cover only a portion of the chamber or wrap around the circumference that surrounds its primary axis. Ideally, at least a portion of each line should align with the window of the handle. In one embodiment, the lines are arranged on a transparent pane fitted to the window.

The chamber may comprise an outer surface and an inner surface, the latter being in contact with the fluid material. The chamber may further comprise a first end and a second end.

In one embodiment, the first end may comprise a first opening that may dispense the fluid onto the target directly or through another component of the device. In one version, the first opening extends from the first end and forms a nozzle. In another embodiment, the first opening may be adapted to be used to fill the chamber with the fluid material.

In one embodiment, the chamber may also comprise a second opening, which is located at the second end of the chamber. In one version, the second end may be disposed for receiving a plunger. Pressing the plunger toward the first opening will force the fluid material through the first opening. In one variation of this embodiment, the plunger is pressed coaxial to the primary axis of the chamber. In another variation, a portion of the plunger protrudes sufficiently perpendicularly to the primary axis such that it can be pressed by the user along an axis parallel to the primary axis. In another version, the plunger may be removed, the fluid material may be placed into the chamber via the second opening, and then at least part of the plunger may be re-inserted into the chamber via the second opening.

In another embodiment, the second end of the chamber comprises a rigid portion. This rigid portion may be pressed by a finger or a plunger to compress the chamber, thereby pressing the fluid material through the first end.

In one embodiment, the chamber comprises threads that may couple with cavity threads disposed on the inner surface of the handle. By rotating the chamber threads in the direction of the cavity threads, the chamber may be snugly fitted to the cavity. By rotating the chamber threads in the reverse direction of the cavity threads, the chamber may be removed. In one version, the chamber threads are disposed near the first end of the chamber and the cavity threads are disposed on the inner surface near the front portion of the handle. In another version, the chamber threads are disposed near the second end of the chamber and the cavity threads are disposed on the inner surface near the back portion of the handle.

In one embodiment, the chamber comprises a track that may be coupled with a track disposed in the cavity. Both tracks may run coaxially to the primary axes of the handle and chamber. When these tracks are engaged, the chamber can be slided in and out of the cavity in a regular manner.

In one embodiment, the chamber comprises one or more tabs near the second end. These one or more tabs allow the chamber to pulled out and/or rotated in relation to the cavity. In another embodiment, the chamber is permanently integrated into or identical to the cavity.

In one aspect, the device comprises a head. The head may comprise a utensil end and an attachment end. The utensil end may comprise a brush, a fork, a nozzle, or other conceivable cooking utensils. The attachment end may permanently or modularly attach to the front portion of the handle such that one head may be replaced with another head featuring a different utensil end. The head may adhere to the same primary axis of the handle, or it may be angled away to assist in the user in operating the device without bending the wrist. The angle may be zero degrees, one hundred and eight degrees, or anything inbetween.

In one embodiment, the attachment end may comprise threading to engage with threading disposed on the outer surface of the front portion of the handle. When the attachment end is rotated in the same direction as the threads on the handle, the head is tightened to the handle. Rotating the head in the reverse direction will loosen the attachment, causing the head and handle to separate.

In one embodiment, the head comprises an opening on the attachment end. The head opening may align with the first opening of the handle and the first opening of the chamber, or it may receive the nozzle of the chamber through the first opening of the handle. In one version, the head opening is connected to a channel that runs through the attachment end into the utensil end. The channel is a tube or substantially cylindrical component that provides a transfer of the fluid material from the chamber to the target. In another version, the channel runs through the attachment end and to the exterior of the device; upon reaching the exterior, it terminates in a spout. In this version, the fluid material may be applied to the target directly, without the utensil end acting as a mediary.

In one aspect, the device comprises a temperature sensing means. The temperature sensing means may be a thermometer or any suitable means to detect and express temperature. It may comprise a bulb filled with a liquid or gas that expands or exerts pressure when heated and compresses or relieves pressure when cooled. It may also comprise a visible or digital scale portion for reading the temperature, wherein the temperature is derived from the activity of the matter in the bulb.

The temperature sensing means may be housed in a recess of the handle. This recess may be embedded in the elongated section of the handle or in a temperature housing that extends from the main body of the handle. The housing may comprise a window, permitting the user to view the scale, and a bulb opening from which the bulb may protrude. In one embodiment, the temperature sensing means comprises a tab that protrudes through a groove or the window of the temperature housing, The tab may be slided by the user along the groove or window, thereby extending it through the opening in order to place it in contact with the target and then retracting it to prevent it from being damaged or obstructing another operation of the device.

In one embodiment, the temperature housing may be modularly attachable to the handle. The temperature housing may slidably coupled by a track disposed on the temperature housing to a track disposed on the top, bottom, or a side portion of the handle.

In one aspect, the device comprises an illumination means. The illumination means may comprise a cluster of light emitting diodes or any suitable electric light. The illumination means may also comprise a power source such as a battery and a button or switch to open and close the flow of electricity through a circuit connecting the power source and the electric light.

The illumination means may be housed in a recess of the handle. This recess may be embedded in main body of the handle or in an illumination housing that extends from the main body of the handle. In one embodiment, the illumination housing may be modularly attachable to the handle. The illumination housing may slidably coupled by a track disposed on the illumination housing to a track disposed on the top, bottom, or a side portion of the handle.

BRIEF DESCRIPTION OF THE DRAWINGS

FIG. 1 is a side view of an exemplary culinary device.

FIG. 2 is a side view of an exemplary culinary device.

DETAILED DESCRIPTION

Figure 3:
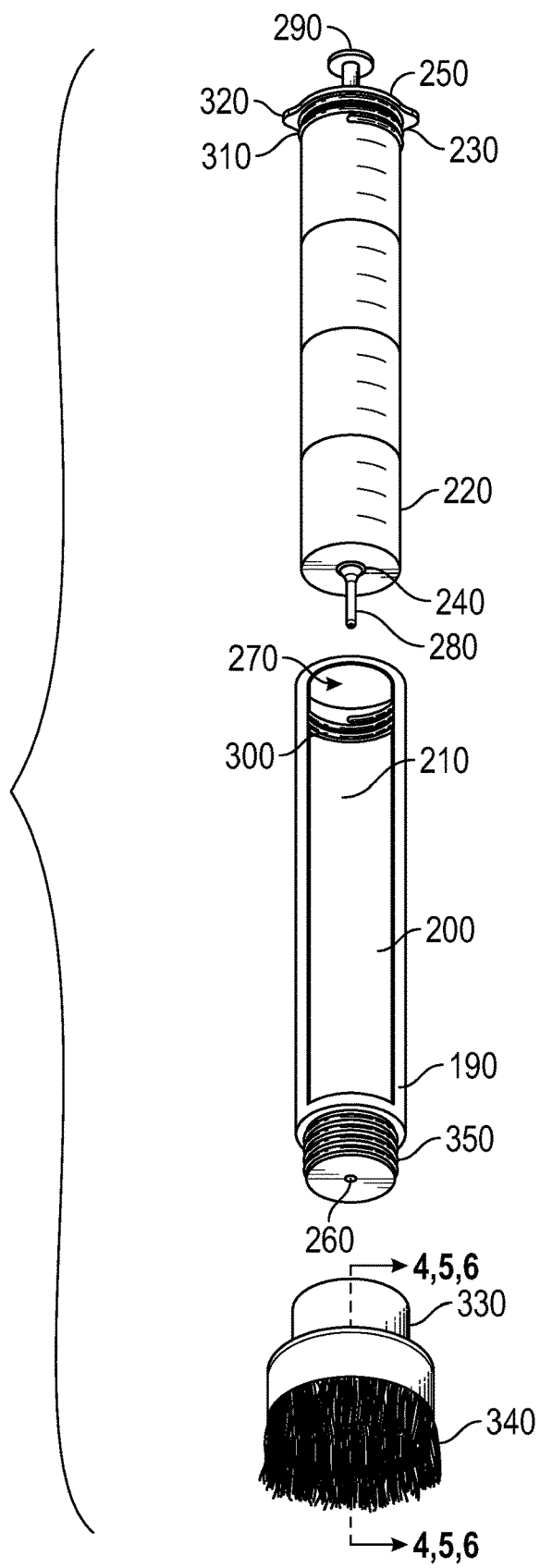
FIG. 3 is an exploded view of an exemplary culinary device.

FIG. 1 shows an exemplary culinary device featuring a handle 10, a head 20, and chamber 30. The chamber can be used to store fluids. These fluid levels are viewable through the handle by means of the handle window 40, and measurable by means of the volumetric measuring lines 50 that are featured on a transparent section of the chamber. The window is disposed on a side portion 60 of the handle, between a front portion 70 of the handle and a back portion 80 of the handle.

FIG. 2 shows an exemplary culinary device featuring a temperature housing 90 and an illumination housing 100. The temperature housing comprises a recess (not shown) that houses a temperature measuring device (not fully shown), a bulb opening 110 that receives and through which the temperature sensing portion 120 of the temperature measuring device protrudes, a window 130 that permits the viewing of a scale portion 140 of the temperature measuring device, and a groove 150 through which a tab 160 of the temperature measuring device protrudes. The illumination housing comprises a recess that houses a light source 170 and a power source 180. The light source is directed toward the head.

FIG. 3 shows an exemplary culinary device featuring an outer surface 190 of the handle and an inner surface 200 of the handle. The inner surface of the handle forms a cavity 210 which can receive the chamber.

The chamber features a first end 220 and a second end 230. The first end features a first opening 240 and the second end features a second opening 250. Similarly, the handle features a first handle opening 260 proximal to the front portion and a second handle opening 270 proximal to the back portion. When the chamber enters the cavity by way of the second handle opening, the first chamber opening aligns with the first handle opening. The first chamber opening may form a nozzle 280, which may enter and be received by the first handle opening. A plunger 290 is disposed at least partly in the chamber by way of the second chamber opening.

The cavity features cavity threads 300 which are engageable with chamber threads 310 disposed on the chamber. When these threads are rotatably engaged, the chamber is substantially locked into the cavity and can only be removed by reversibly rotating the chamber with respect to the cavity. A tab 320 extending perpendicularly from the second end facilitates the rotating and reversible rotating of the chamber with respect to the cavity.

The head features an attachment end 330, which attaches to the handle, and a utensil end 340, which features a utensil used in cooking or food preparation. In this figure, the utensil end is a basting brush.

Figure 4:
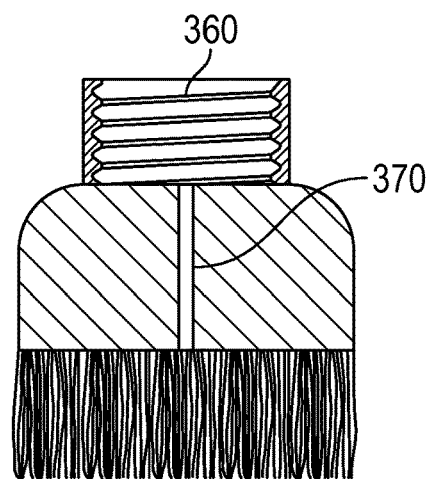
FIG. 4 is a cross-sectional view of a head of the exemplary culinary device in FIG. 3.
Figure 5:
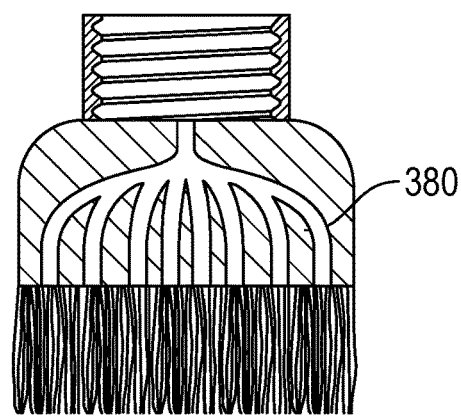
FIG. 5 is a cross-sectional view of a modified version of the head of the exemplary culinary device in FIG. 3.
Figure 6:
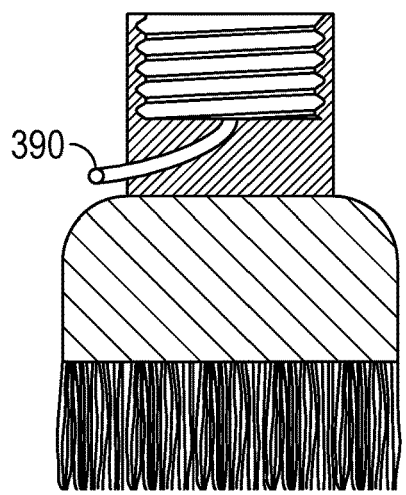
FIG. 6 is an alternative cross-sectional view of a modified version of the head of the exemplary culinary device in FIG. 3.

In FIGS. 3-4, Handle threads 350 are disposed on the front portion of the handle, and threadably engage with the head threads 360, which are disposed on the attachment end of the head. When the head threads and handle threads are rotationally engaged, the head and handle become locked together. In order to unlock them, it becomes necessary to reversibly rotate the head with respect to the handle. The head also features a head opening 370, which is disposed on the attachment end. When the head and handle are attached, the first handle opening aligns with the head opening, and if the chamber has a chamber nozzle, then the chamber nozzle aligns and enters the first handle opening. Fluid material stored in the chamber can pass or be pressed through the first chamber opening, through the first handle opening, and through the head opening onto the bristles of the brush or any other kind of utensil that is used. In FIG. 5, the head opening opens into a plurality of head channels 380. These ends of these channels, which may communicate with the brush or other utensil end portion, are spaced apart. The fluid material may then be spread more evenly across an area of the utensil. In FIG. 6, the head opening forms a spout 390. The spout provides an exit for the fluid material without having to enter and/or be distributed into the utensil end.

The invention claimed is:

1. Culinary device comprising a handle, a chamber for storing fluids, a head, and a temperature measuring device configured to measure temperature, wherein:

the handle comprises a front portion, a back portion, one or more side portions, an inner surface, an outer surface, a first handle opening, a second handle opening, and a window, wherein the inner surface comprises a cavity for receiving the chamber through the second handle opening, and the window is disposed on one of the one or more side portions;

the chamber comprises an at least partly transparent portion for viewing stored fluid, a plurality of volumetric measuring lines, a first end, and a second end, wherein the first end comprises a first chamber opening and the first chamber opening aligns with the first handle opening, and the second end comprises a second chamber opening and the second chamber opening is disposed for receiving a plunger; and the head comprises a culinary utensil end an an attachment end, wherein the attachment end attaches to the front portion of the handle and comprises a head opening, and the head opening aligns with the first handle opening.

2. Device in claim 1, wherein the second end of the chamber comprises a tab extending substantially perpendicularly from the chamber.

3. Device in claim 2 wherein chamber threads are disposed on the chamber for rotatably engaging with cavity threads disposed on the inner surface of the handle.

4. Device in claim 1, wherein the chamber is permanently integrated into the handle.

5. Device in claim 1, wherein head threads are disposed on the attachment end of the head and rotatably engageable with handle threads disposed on the front portion of the handle.

6. Device in claim 1, wherein the first chamber opening forms a nozzle, and the first handle opening and the head opening are disposed to receive the nozzle.

7. Device in claim 1, wherein the head is removably attachable to the handle.

8. Device in claim 1 wherein the head opening opens into a plurality of head channels.

9. Device in claim 1, wherein the head opening terminates in a spout and the spout does not enter the culinary utensil end.

* * * * *